Dec. 6, 1927. 1,652,146
A. J. MICHELIN
DEEP RIM FOR PNEUMATIC TIRES
Filed April 10, 1924 4 Sheets-Sheet 2
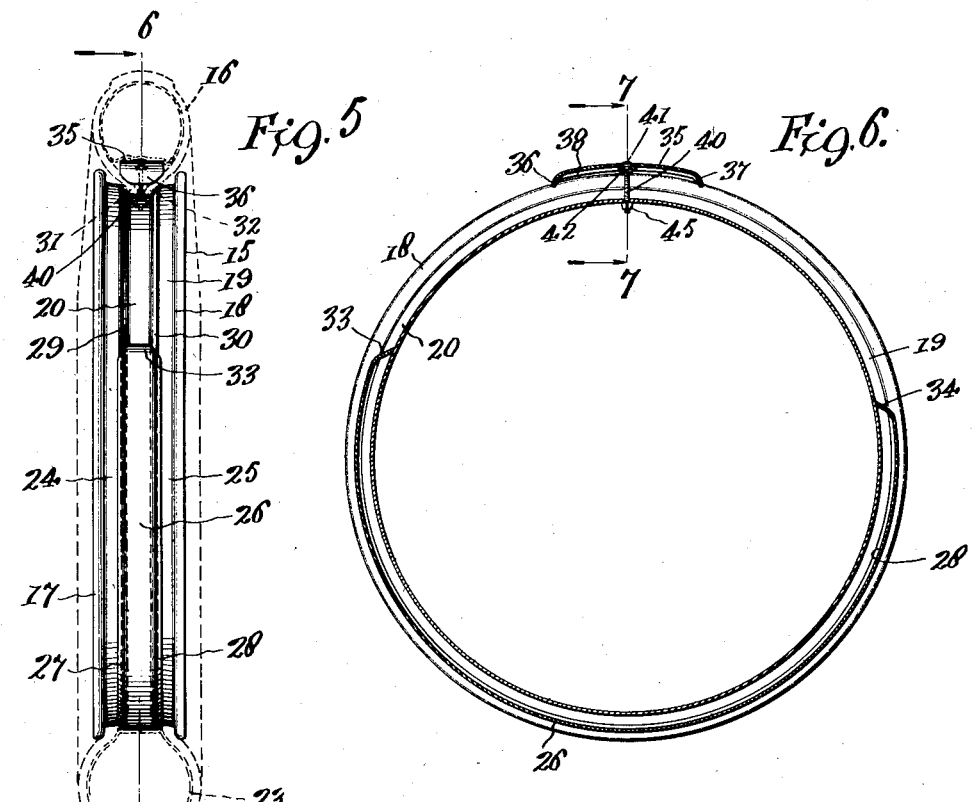
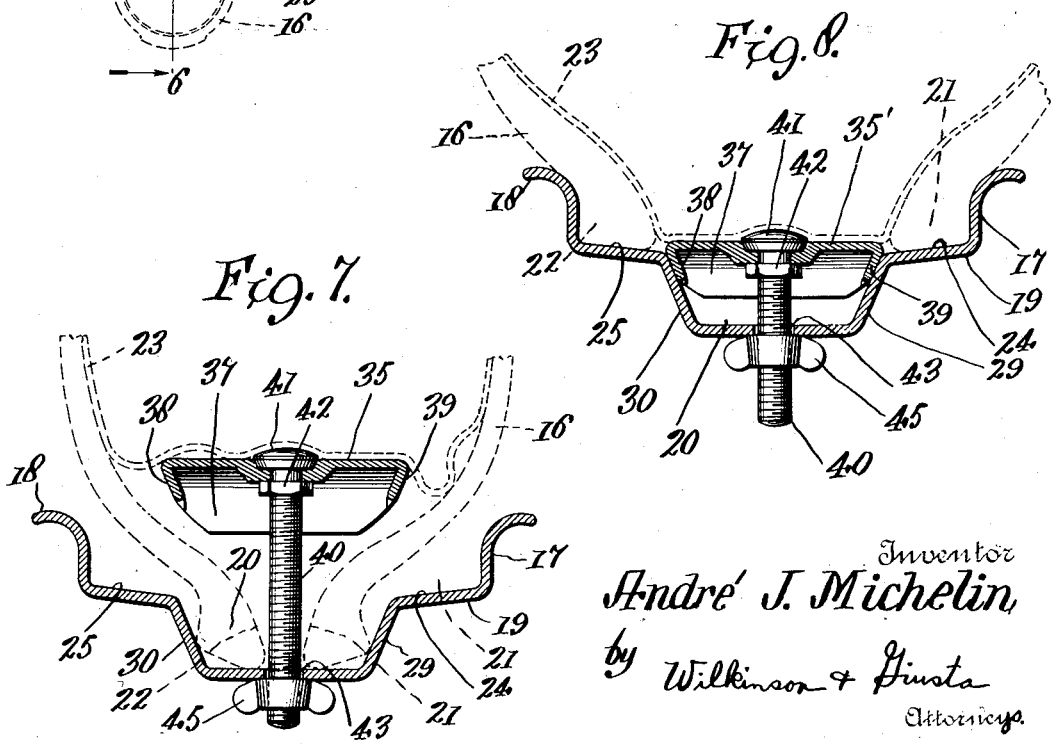
Inventor
André J. Michelin
by Wilkinson & Giusta
Attorneys Dec. 6, 1927.
A. J. MICHELIN
1,652,146
DEEP RIM FOR PNEUMATIC TIRES
Filed April 10, 1924 · 4 Sheets-Sheet 3
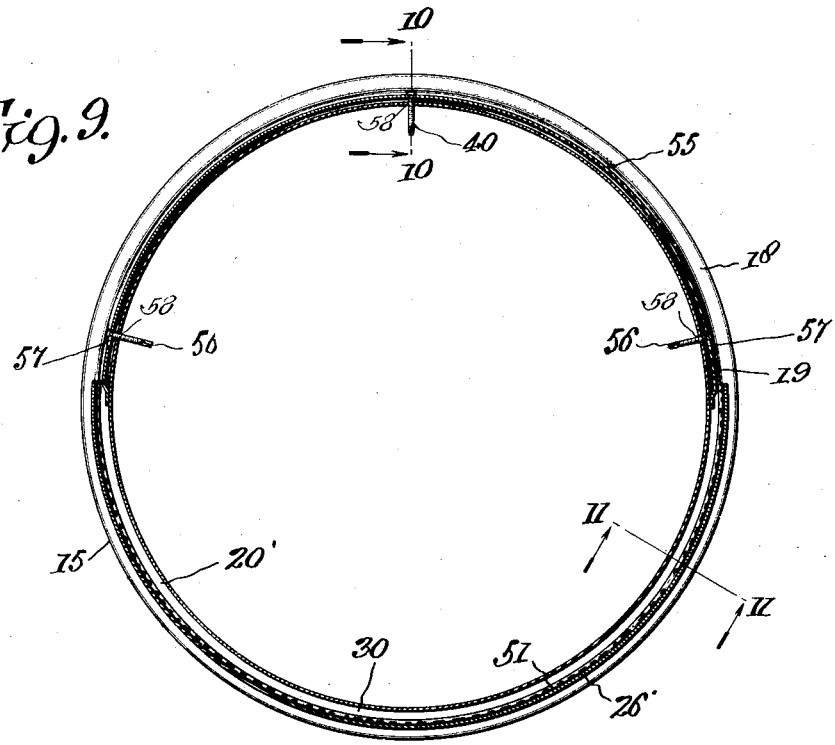
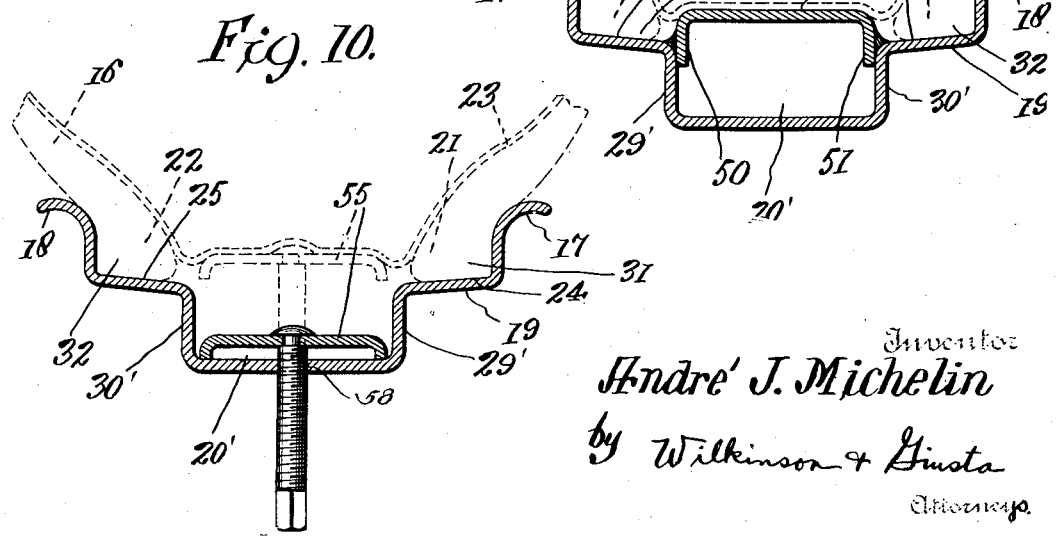
Inventor
André J. Michelin
by Wilkinson & Giusta
Attorneys.

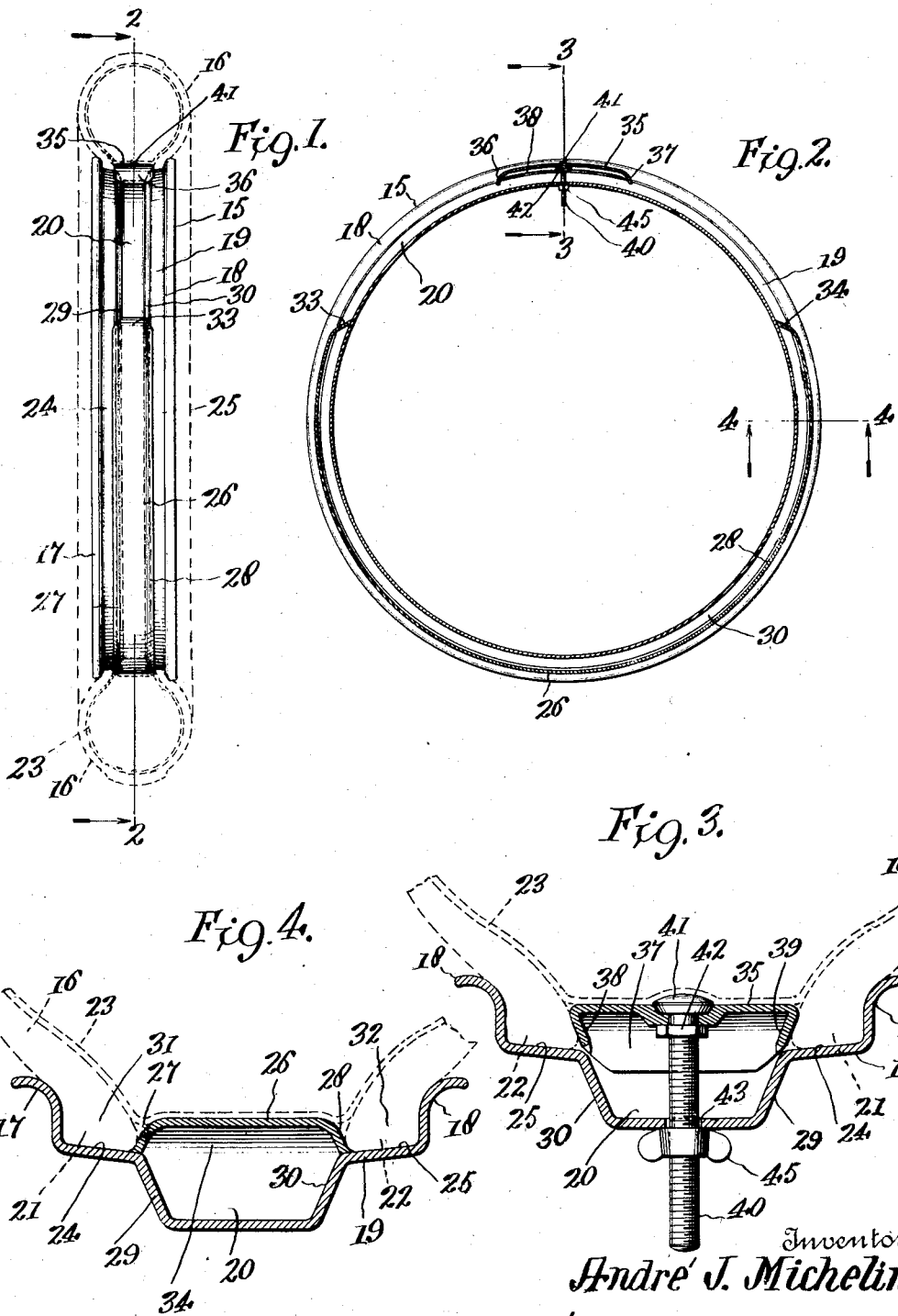

Dec. 6, 1927.

A. J. MICHELIN 1,652,146

DEEP RIM FOR PNEUMATIC TIRES

Filed April 10, 1924     4 Sheets-Sheet 4

Inventor
André J. Michelin
by Wilkinson & Giusta
Attorneys

Patented Dec. 6, 1927.

1,652,146

UNITED STATES PATENT OFFICE.

ANDRÉ JULES MICHELIN, OF CLERMONT-FERRAND, FRANCE, ASSIGNOR TO MICHELIN ET CIE., OF CLERMONT-FERRAND, FRANCE, A CORPORATION OF FRANCE.

DEEP RIM FOR PNEUMATIC TIRES.

Application filed April 10, 1924, Serial No. 705,605, and in France January 14, 1924.

This invention relates to deep rims for automobile wheels which are provided with pneumatic tires, and has for its principal object to provide a rim of this type which, while retaining all of the advantages inherent thereto as regards the mounting and demounting of the tires, will, at the same time, eliminate the possibility of the beads of the tire entering the deep rim channel should the tire become partially deflated while in use, which condition has heretofore resulted in the tire coming off of the rim entirely with the consequent disastrous results in numerous instances.

The so-called deep rim for automobile wheels and tires, usually comprises a metallic annulus of substantially channel-shape in cross section, the web of which is provided with a medial circumferentially depressed groove into which portions of the beads of the tire may enter when the tire is in its deflated condition, whereby the diametrically opposed portions of the said beads will drop below the flanges of the rim to the end that removal of the tire may be started at such point and carried on at successive points around the rim, without the necessity of providing a separate retaining ring which is detachable from the rim itself.

The beads, under normally operated conditions, are prevented from slipping into the grooves by the inflation of the inner tube of the tire, which forces the said beads outwardly against the rim flanges. However, should the tire become partially deflated, no provision is made to prevent the beads from slipping into the central circumferential groove with the result that if the vehicle is run with the tires in this condition, they work their beads over the retaining flanges and leave the rims entirely. With the present invention, however, provision is made for preventing the beads from working away from the flanges and into the groove, should the tire become partially deflated, although the means provided may be readily adjusted to permit the said beads to enter portions of the groove for the purpose of removing a tire, when desired.

With the above and other objects in view, which will appear as the description proceeds, the invention consists in the novel details of construction, combinations and arrangements of parts more fully hereinafter disclosed and particularly pointed out in the appended claims.

Referring to the accompanying drawings forming a part of this specification in which like reference characters designate like parts in all the views;

Figure 1 is an edge elevational view of a rim constructed in accordance with the present invention, a pneumatic tire being indicated in dotted lines in place thereon;

Fig. 2 is a central sectional view of the parts shown in Fig. 1, taken approximately on the plane indicated by the line 2—2 of the said figure, looking in the direction of the arrows;

Fig. 3 is an enlarged cross-sectional view, through the rim, taken approximately on the plane indicated by the line 3—3 of Fig. 2, looking in the direction of the arrows;

Fig. 4 is a view similar to Fig. 3, taken approximately on the plane indicated by the line 4—4 of Fig. 2.

Fig. 5 is a view similar to Fig. 1, but showing the parts in position to permit of the removal of the tire;

Fig. 6 is a central vertical sectional view taken approximately on the plane indicated by the line 6—6 of Fig. 5;

Fig. 7 is an enlarged transverse sectional view taken approximately on the plane indicated by the line 7—7 of Fig. 6;

Fig. 8 is a view similar to Fig. 3, but showing a slightly modified form of construction;

Fig. 9 is a view similar to Fig. 2, showing a somewhat further modified form of construction;

Figure 12:
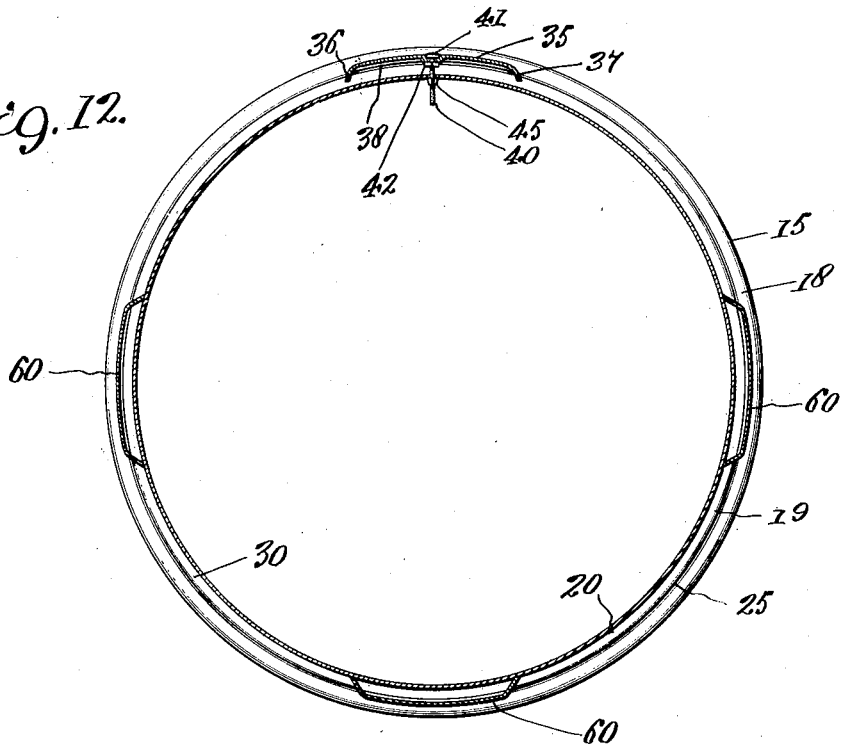
Figure 13:
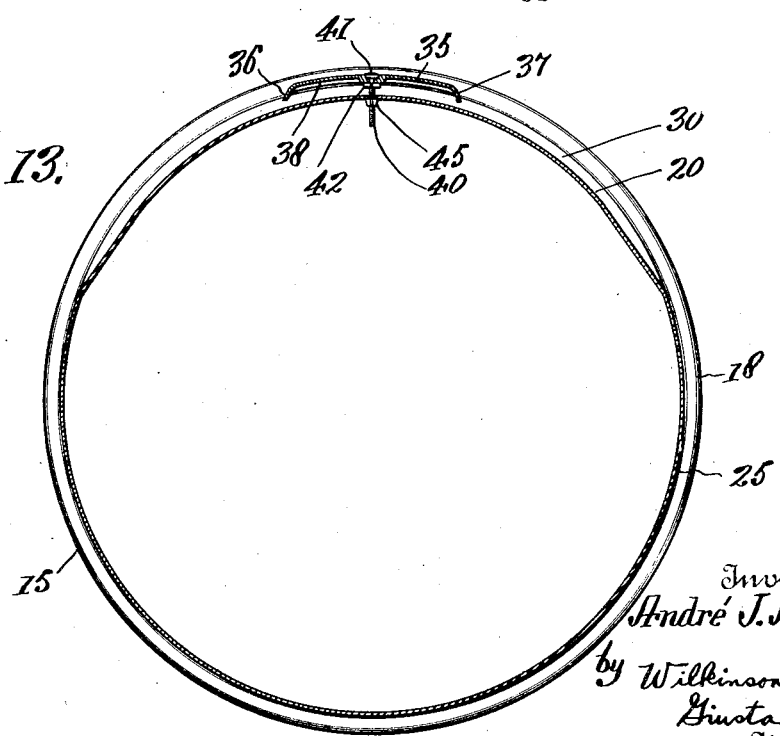

Figs. 10 and 11 are enlarged cross-sectional views, taken respectively on the planes indicated by the lines 10—10 and 11—11 of Fig. 9, looking in the direction of the arrows;

Fig. 12 is a central sectional view, similar to Fig. 2, of a still further modified form of the invention; and, Fig. 13 is a similar view of a still further modified form of the invention.

Referring more especially to Figs. 1 to 7 inclusive, the numeral 15 indicates generally the rim of the automobile wheel which is adapted to receive a pneumatic tire 16. The said rim, as will be clear from the drawings, comprises a metallic annulus which is substantially channel-shaped in cross section, having the spaced side flanges, 17 and 18, connected together by the web 19. The said web 19 is provided intermediate the said flanges 17 and 18 with the depression or groove 20, extending completely around the circumferences of the rim into which groove the beads 21 and 22 of the tire 16 may enter to facilitate the removal of the said tire from the rim.

The construction thus far described comprises the well known deep rim for automobile wheels on which it is possible to mount a pneumatic tire, such as 16, without the necessity of the removal of a retaining ring or flange, as has been heretofore common in rims of standard channel cross section. The mounting of the said tire with this form of rim may be accomplished by entering a portion of the beads, 21 and 22 of the tire, while in its deflated condition, into the upper portion of the groove 20 and then forcing the remaining portion of the beads over one of the side flanges, 17 or 18, until the entire circumference of the beads is brought between the two flanges.

Upon inflation of the tube 23 of the tire, the beads will be moved outwardly, both circumferentially and laterally, to occupy positions upon the side portions, 24 and 25, of the web 19 which lie between the groove 20 and the flanges 17 and 18, respectively, as is clearly indicated in Figs. 1 and 4.

When in this position, the tire would be effectively maintained in position upon the rim so long as its tube 23 is kept inflated to the proper air pressure. However, in actual practice, if the pressure within the tube 23 is permitted to fall beyond a certain point, so that the tire becomes more or less deflated, there will be a tendency for the beads 21 and 22 to work inwardly away from the flanges, 17 and 18, and to enter the groove 20, with the result that if the vehicle is run with the tire in this condition, the latter will in many instances work itself off of the rim entirely.

In order to prevent this from happening, when the tires become partially deflated, I propose to close or eliminate such portion of the groove 20 as is not absolutely essential for the placing and removing of the tire upon the rim and in the remaining portion of the groove to provide means whereby the beads of the tire may be effectively prevented from entering therein except at such times as it may be desirable for them to do so for the purpose of removing or placing the tire upon the rim.

In the form of the invention shown in Figs. 1 to 7 inclusive, I have provided an arcuate plate member 26 of sufficient width to extend across the groove 20 and of sufficient length to extend approximately three-fifths of the way around the circumference of the rim. The side edges of the member 26 may be turned outwardly as indicated at 27 and 28 and welded or otherwise secured to the web 19 at the point where it joins the inclined side walls 29 and 30 of the groove 20, see Fig. 4.

As clearly shown in said Fig. 4, the plate member 26 will thus be raised somewhat above the plane of the web 19, thus forming two channels, 31 and 32, through an arc of from 200 to 220 degrees into which channels, the beads 21 and 22 of the tire will be received.

At a point substantially equi-distantly spaced from the two ends, 33 and 34, of the member 26, I provide a relatively short movable plate or member 35, see Figs. 1, 2 and 3, which member is preferably provided with the inturned ends 36 and 37, and the inturned side flanges, 38 and 39, which are preferably bent inwardly to form an acute angle whereby they will occupy planes substantially parallel to the planes of the side walls, 29 and 30 of the groove 20.

The said plate or member 35 is carried upon a threaded stud or bolt 40, the head 41 of which is preferably rigidly secured to the said member or plate 35, as for example by means of the locking nut 42, and which stud projects radially inwardly through the groove 20 and passes through an aperture 43, provided in the bottom wall of the said groove. The said stud 40 carries a suitable wing or other nut 45 which normally engages the under surface of the bottom wall of the groove 20 to draw the member 35 downwardly, as viewed in Fig. 3, whereby its inclined side walls 38 and 39 may force the beads 21 and 22 of the tire 16 outwardly into engagement with the side flanges 17 and 18 of the rim, as clearly indicated in the said figure.

The mode of operation in placing a pneumatic tire on a rim constructed as above described is as follows. The nut 45 is first backed off to substantially the lower end of the stud 40 and the latter manually moved upwardly from the position indicated in Fig. 3 to that indicated in Fig. 7, the rim being preferably disposed so that the said stud occupies a substantially vertical position at the upper side of the rim, as indicated in Figs. 2 and 7.

The tire casing 16, together with the deflated inner tube 23 in place therein, is then started upon the rim from the upper side, the beads 21 and 22 of the said casing entering the groove 20 at the top of the rim where the latter is not closed by the member 26. The movable plate member 35 thus enters within the casing, as indicated in Fig. 7, and the inner tube 23 of the tire rests thereon, as shown in the said figure.

Due to the fact that the beads of the tire thus enter the groove 20 at the upper portion, the beads will occupy an eccentric position relative to the flanges, 17 and 18 of the rim, so that the lower portions of the said beads may be readily worked over the said flanges by means of the usual tire tools, until the beads have been introduced between the flanges, 17 and 18, throughout their entire circumference.

As above explained, the lower portion of the groove 20 is closed throughout an arc of from 200 to 220 degrees by a plate member 26, which, being somewhat elevated above the plane of the web 19 of the rim, provides the two channels, 31 and 32, into which the portions of the beads, 21 and 22, adjacent thereto enter. If the wing nut 45 be now manipulated to draw the stud 40 and member 35 downwardly from the position shown in Fig. 7, to that shown in Fig. 3, the inclined side walls, 38 and 39 of the said member 35 will wedge the upper portions of the beads 21 and 22 outwardly against the flanges, 17 and 18, so that the said beads will engage the said flanges throughout their entire circumference.

Furthermore, the inclined side walls, 38 and 39, of the member 35 will effectively prevent the said beads 21 and 22 from working their way back into the groove 20, even when the tire is in its deflated condition, as will be readily understood from Fig. 3.

The mode of removing the tire is substantially the reverse of the above described operation, and it is believed that it will be readily apparent without detailed description.

In the form of the invention shown in Figs. 1 to 7 inclusive, the movable plate or member 35 is illustrated as being of such a width that its inclined side flanges will not enter into the groove 20 to any appreciable extent, but will occupy positions somewhat above the plane of the web 19, as shown in Fig. 3. This, however, is not absolutely essential, since the member 35 may be made of a somewhat narrower width so that its side flanges 38 and 39 will enter into the groove 20, as shown in the slightly modified form of the invention in Fig. 8. Otherwise the construction illustrated in this said figure is the same as that previously described.

In the form of the invention shown in Figs. 9, 10 and 11, the side walls 29' and 30' of the groove 20' instead of being inclined, as was the case in the preceding figures, are shown as being substantially vertical and parallel. Furthermore, in this form, the arcuate member 26' which closes the major portion of the groove 20' is substantially channel-shaped in cross section with its flanges 50 and 51 extending downwardly within the said groove 20', it being united to the walls 29' and 30' thereof in any suitable manner, as for example by welding, see Fig. 11.

The movable member 55 of this form is extended in length to embrace the remaining portions of the groove 20', which are not closed by the member 26' and is preferably made of flexible sheet metal. In this form it is desirable to provide additional studs 56, located adjacent the ends of the member 55 whereby these ends may likewise be expanded the same as the central portion, which will still be controlled by the stud 40. All of the said studs are externally threaded, as shown, for engagement in threaded apertures 58, formed in the bottom wall of the groove 20, and the heads of the studs 56 preferably work in slots 57, provided in the member 55, as will be clear from Fig. 9, to permit of the expansion of the parts without binding.

In the form of the invention illustrated in Fig. 12, the continuous member 26, which closes the major portion of the groove 20, is omitted, and in lieu thereof the three relatively short members 60 are secured at points substantially 90 degrees apart to close such portions of the said groove as may be embraced within them. These members may be of the same cross section as was disclosed in Fig. 4, or if the shape of the rim itself is varied, as illustrated in Fig. 11, they may take the cross section shown in the latter figure. They are, however, rigidly secured in the same relative position over the groove 20, and as will be readily understood, they will effectively prevent the beads, 21 and 22, of the tire from sliding down into the said groove, should the tire become partially deflated.

All of the forms of the invention heretofore described are equally adaptable for use with deep rims which have been already manufactured, and with new rims in the course of manufacture, since it is only necessary to stamp or otherwise form the members, such as 20 and 35, and to weld or otherwise secure the formed members in their position across the groove 20. However, in Fig. 13 I have shown a form of the construction which is applicable to new rims wherein the groove 20 is formed only through an arc of approximately 140 to 160 degrees, the remaining portion of the web 19 of the rim being left in its original straight condition.

It is thus unnecessary to provide the members, such as 26, for closing the groove 20 through the arc of from 200 to 220 degrees, although it is, of course, still necessary to provide a movable member, such as 35, the function of which still remains the same.

It will also be obvious that, if desired, the place of the stud 40 may be taken by the stem of the inner tube of the tire, which stem contains the tire valve and usually projects inwardly through the frame of the wheel. These stems are also usually threaded in substantially the same manner as the studs 40, so that it is only necessary to pass the stem through the aperture in the member 35 and to tighten up the lock nut such as 42 against the said member, whereupon the parts may be employed in exactly the same manner as that above disclosed.

It will thus be seen that in all forms of the invention there is provided a rim for automobile wheels wherein all of the advantages of the so-called deep rim are retained, while at the same time the possibility of the tire coming off of the wheel due to its beads slipping down into the groove of the deep rim when the tire becomes partially deflated, is eliminated. Furthermore, the construction is such that it may be readily and inexpensively applied either to rims which are already in use or to new rims.

It is obvious that those skilled in the art may vary the details of construction as well as the arrangement of parts without departing from the spirit of the invention, and therefore, it is not wished to be limited to the above disclosure except as may be required by the accompanying claims.

What is claimed is:

1. A deep rim for automobile wheels having a medial bead receiving depression extending only a part way around its circumference; and means for preventing the beads from entering said depression.

2. A deep rim for automobile wheels having a medial bead receiving depression extending only a part way around its circumference; and means for preventing the beads from entering said depression, said means being adjustable to permit said beads to enter said depression when desired.

3. A deep rim for vehicle wheels comprising an annulus substantially channel shaped in cross section, a portion only of the web of which is provided with a bead receiving groove; and radially adjustable means associated with said groove for permitting or preventing said beads from entering said groove at will.

4. A deep rim for vehicle wheels comprising an annulus substantially channel shaped in cross section, a portion of the web of which is provided with a medial circumferentially extending bead receiving groove; and a radially adjustable plate for permitting or preventing portions of the beads from entering said groove.

5. A deep rim for vehicle wheels comprising an annulus substantially channel shaped in cross section, a portion of the web of which is provided with a medial circumferentially extending bead receiving groove; and a radially adjustable plate provided with a stud passing through said rim for permitting or preventing portions of the beads from entering said groove.

6. A deep rim for vehicle wheels comprising an annulus substantially channel shaped in cross section, a portion of the web of which is provided with a medial circumferentially extending bead receiving groove; and a radially adjustable plate provided with a threaded stud passing through said rim and an adjusting nut for permitting or preventing portions of the beads from entering said groove.

7. A deep rim for vehicle wheels comprising an annulus substantially channel shaped in cross section, a portion of the web of which is provided with a medial circumferentially extending bead receiving groove; and a radially adjustable plate having bead engaging side flanges for permitting or preventing portions of the beads from entering said groove.

8. A tire carrying rim having oppositely disposed bead seating portions and a central inwardly projecting portion and arched filler members connected to the rim within the inwardly projecting portion, the central outermost portions of said arched fillers being in substantial alignment with the adjacent bead seating portions of the rim, said fillers being arranged at substantially diametrically opposite points.

9. A deep rim for vehicle wheels comprising an annulus substantially channel shaped in cross section, the said annulus being provided with a central medial groove extending throughout the circumference of the annulus, with a plurality of arched filler members secured to the rim at different portions thereof and projecting into said groove, and a radially movable safety piece adapted to be moved into or out of said groove, for permitting or preventing portions of the bead from entering groove, as desired.

ANDRÉ JULES MICHELIN.